Sept. 10, 1935.　　　G. F. LOVELESS　　　2,014,071
UNIVERSAL MOTOR MOUNTING
Filed Feb. 16, 1933
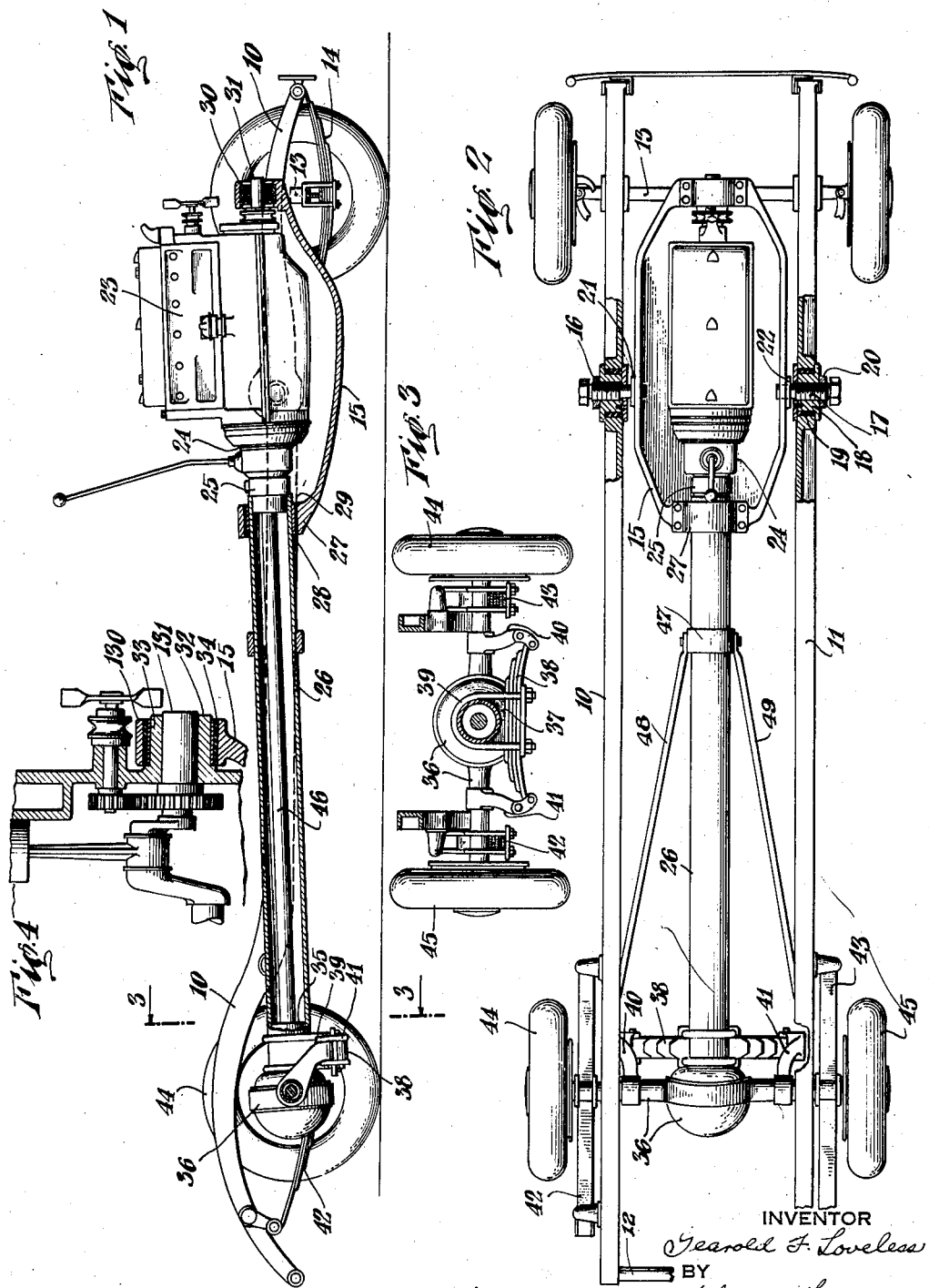
INVENTOR
Gearold F. Loveless
BY
Watson, Bristol, Johnson & Leavenworth
ATTORNEYS Patented Sept. 10, 1935

2,014,071

UNITED STATES PATENT OFFICE 2,014,071

UNIVERSAL MOTOR MOUNTING

Gearold F. Loveless, Westfield, N. Y.

Application February 16, 1933, Serial No. 657,045

19 Claims. (Cl. 180—57)

This invention relates to motor mountings for automotive vehicles.

A general object of the invention is the provision of an improved means of mounting the power plant of a power propelled vehicle with respect to the vehicle frame, to obtain better riding and operating performance.

More specifically, the invention has for a salient object the elimination of undesired motor vibrations and twisting forces in the vehicle frame through provision of a flexible motor mounting wherein the vibratory and twisting impulses developed in the motor are dissipated or are transmitted to the ground independently of the vehicle frame. To this end, the invention particularly contemplates the provision of a mounting wherein the motor is universally movable with respect to the car frame, and wherein such movement is directly cared for and cushioned at the driving wheels of the vehicle and their associated axle.

A further object of the invention is the provision of a novel flexible power plant mounting which eliminates need for a universal joint in the drive shaft, with consequent avoidance of frictional energy losses at this joint, and with further avoidance of excess wear of various moving parts attendant upon wear and loose motion in such universal joint.

Another object of the invention is to provide an improved motor vehicle construction possessing the above or other advantages, wherein the power plant and its associated means for propelling the vehicle comprise a single unit which is readily separable from the vehicle body and frame, whereby assembly and disassembly during construction or repair are greatly facilitated.

Another object of the invention is the provision of a motor mounting wherein the weight of the motor and its associated parts is substantially balanced on the vehicle chassis so as to eliminate or materially reduce end-bobbing when the vehicle is under way.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a longitudinal view in partial vertical section taken substantially medially along the chassis of a motor vehicle embodying features of the present invention;

Fig. 2 is a top plan view of a chassis such as that shown in Fig. 1;

Fig. 3 is a transverse vertical sectional view taken substantially along line 3—3 of Fig. 1; and Fig. 4 is a detailed vertical sectional view, on an enlarged scale, taken longitudinally through the forward portion of an engine casting and showing a preferred form of pivotal mounting for the latter.

While certain features of the presently claimed invention obviously are advantageously applicable to all forms of motor propelled vehicles, including such automotive conveyances as aeroplanes and motorboats, its benefits are primarily useful in automobile construction, and it is this last type of vehicle which is particularly shown and described in the illustrated embodiment of the invention. However, it is to be understood that other types of conveyances, such as those mentioned, are contemplated, and are to be deemed included in the present description and claims, wherever the context permits.

Referring more particularly to the drawing, there is shown an automobile chassis comprising side frame elements 10 and 11 which are adapted to support the car body and which are held in spaced relation by cross strut elements such as 12 which may be of any desired number and design. A front axle 13 spans these side frame elements near their forward ends and supports them by means of leaf springs 14. The front axle is equipped at its outer ends with front wheels which are pivotally connected thereto and are equipped with steering knuckles and other conventional appurtenances (not shown), as will be readily understood by those skilled in the art. If desired, the car parts thus far described, including the car body, frame elements 10 and 11, the front steering wheels, and their associated steering appurtenances, may be assembled as a unit independently of the power plant of the car, and this power plant may subsequently be installed as a unit, as will hereinafter more clearly appear.

The power unit includes a cradle or sub-frame 15 illustrated as being in the form of a suitably shaped casting which is adapted to underlie and support the engine or motor. It is to be understood the cradle can take other appropriate shape and design. This cradle is rockable or swingable forwardly and rearwardly with respect to the main frame, and to this end, it is illustratively shown pivotally supported on a transverse horizontal axis by means of studs or trunnions 16 and 17 which are respectively supported by frame elements 10 and 11. As illustrated, each of these trunnions is preferably threaded through a frame bearing 18 having a live rubber cushion 19 between it and the adjacent side frame elements. A lock nut 20 holds each trunnion in position with its unthreaded inner end extending into and pivotally supporting cradle 15 at points 21 and 22. If desired, the rubber cushion at 19 may be dispensed with, and the trunnions simply threaded through suitably reinforced portions of their respective frame elements.

Upon or within this cradle 15, which is pivotal about a transverse axis, the motor casting and other associated parts are pivotally mounted along a longitudinal axis. This motor casting will, of course, vary with different kinds of vehicles. In the illustrated embodiment it comprises the motor proper, designated 23, the flywheel and transmission casing generally indicated at 24, and, if desired, a rearwardly extending casing 25 which houses the free wheeling equipment. These parts are integrally, or at least rigidly, interconnected. Fastened rigidly to the motor casting at 25 is a torque tube 26, which extends rearwardly therefrom to the vicinity of the rear axle housing. The torque tube is concentric with the drive shaft and the motor and its associated tube is pivotally mounted on cradle 15 so as to be freely swingable with respect thereto along a longitudinal axis which desirably extends substantially in the same direction as the drive shaft axis and preferably coincides therewith. To this end, cradle 15 may be provided near its rearward extremity with a bearing 27 which embraces and rotatably supports the torque tube or other suitable part adjacent the motor casting. Preferably this bearing 27 comprises an inner bushing 28 formed of suitable bearing metal, which is surrounded by a live rubber cushion 29. At its forward end cradle 15 is provided with an additional bearing 30, which, as shown in Fig. 1, may support a forward extension 31 of the crank shaft, or a suitable part on the motor casting.

In Fig. 4, there is shown an alternative and preferred form of front bearing for supporting the motor casting on cradle 15. Here a forwardly extending hollow trunnion 32 is formed integrally with the motor casting, and this trunnion is pivotally supported in a front cradle bearing 130. Like the rear cradle bearing, this also preferably is cushioned by means of a construction involving an inner bushing 33 and a layer of rubber 34, as illustrated. A forward extension of the crank shaft, designated 131, extends through trunnion 32 for access by a manual starting crank, and the usual fan belt pulley is replaced by a suitable gear train, as shown in the drawing.

The rear end of torque tube 26 is telescoped over a casting 35, which houses parts of the ring and pinion gear assembly, and which is rigidly fastened to the rear axle housing 36. The torque tube may be fastened directly to the rear axle casting, but desirably is freely slidable over the casting 35, being anchored to the rear axle housing so as to transmit its twisting moment thereto. This anchoring means comprises an enlarged seat 37 (see Fig. 3) on the rear end of the torque tube, against which abuts a stiff torque spring 38. Spring 38 is of leaf form and is held tightly against seat 37 by means of a shackle 39 so that the spring is rigid with the torque tube and is compelled to partake of any movement of the latter. At its lateral extremities the torque spring 38 is shackled to brackets 40 and 41, which in turn are anchored to the rear axle housing 36. This housing 36 is suspended from the side frame elements 10 and 11 by rear springs 42 and 43 which may be of any suitable or conventional design. Rear driving wheels 44 and 45 are rotatable at the outer ends of axle housing 36, and are suitably driven from the differential gear by means of conventional inner driving axles, as will be readily understood. The rear axle housing 35, its differential housing 35, and like associated parts, are collectively referred to herein as the "axle".

Power is transmitted from the motor to the differential by a propeller shaft 46 which is located within the torque tube and which, like the latter, is concentric with the motor crank shaft. This propeller shaft preferably extends directly from the differential to the free wheeling clutch at 25, or if the latter is not used, then to the transmission housing, without the inclusion of any universal joint.

A torque tube brace is provided, which comprises a sleeve 47 within which the tube is freely rotatable, and struts 48 and 49 fastened to this sleeve and extending rearwardly, where they are fixedly anchored to the rear axle housing in any suitable manner.

From the construction thus described, it will be seen that the motor and its rigidly associated torque tube are supported from the vehicle frame by what is in effect a gimbal mounting, and that the motor, torque tube, and cradle 15 all are freely movable about the transverse axis of trunnions 16 and 17, while the motor and torque tube in turn are freely movable about the longitudinal axis of bearings 27 and 30 (or 130). The motor thus is mounted for universal movement with respect to the car frame. Movement of the power unit about the transverse axis of trunnions 16 and 17 is cushioned, with respect to the car frame, by rear springs 42 and 43. The position of trunnions 16 and 17, longitudinally of the car, will be determined by the weight of the power unit suspended therefrom, the latter being hung on these trunnions in approximately balanced or stable condition. This balanced suspension at 16 and 17 tends to minimize the tendency of the power unit to swing about these points, and materially curtails end-bobbing while the vehicle is under way.

As is well understood, the starting, and operation, of an internal combustion engine or motor develops a twisting torque, which through reaction tends to twist or tilt the motor casting in a direction counter to that of the crank shaft rotation. With the present construction, any twisting impulses or vibrations tending to turn the motor about its longitudinal axis are conveyed by the torque tube to the torque spring 38 and thence to the rear axle housing 36. Such twisting forces accordingly are taken up by spring 38, rear springs 42 and 43, and by the air in the tires of the rear wheels 44 and 45, being conveyed directly to the ground through these elements without affecting the car body and frame, any reacting force toward the car frame being cushioned by the rear springs. It will thus be seen that substantially all the twisting and vibration causing forces developed in the power plant are confined and cared for within the power and driving plant, and that the car frame with passenger or load body is substantially freed from such influences.

The complete power and car driving plant comprising the motor, cradle 15, torque tube 26, and the rear axle and wheels, comprise a single mechanical unit which includes nearly all of the moving, or working, parts of the car. A motor vehicle thus constructed is formed of two major, and substantially independent or separable units, one unit comprising the car body, its associated underlying frame, such as 10 and 11 in the instant disclosure, and the front wheels and their appurtenant steering structure, while the other unit comprises the described power plant. This type of construction possesses many inherent advantages tending to facilitate assembly of the car during its manufacture and also tending to save time in repair of the car. That is, it is possible to effect increased manufacturing efficiency through the ability separately to build the two major units of the car and subsequently to couple them in the quick and simple manner permitted by the present construction. Also, considerable saving of time in repairing the car is obtained, since it is possible to remove substantially all of the working parts of the car, as a unit, in a very short time. To this end, it is intended that those parts of the car which are associated with both the car frame unit and the power unit shall be, as far as possible, readily detachable from one or the other of these units. These parts, comprising ignition wiring, brake and clutch pedals, brake rods, gas line, etc., have not been shown in detail since their construction will follow more or less conventional lines, and since the various mechanical expedients involved in making them readily detachable from the frame or power unit will readily occur to those skilled in the art.

Since the power plant itself is universally mounted on the car frame, the motor crank shaft and the propeller shaft 46 may be and are at all times in alinement, so that no universal joint in the drive shaft need be used. This constitutes one of the advantageous features of the present invention, since the conventional type of universal joint dissipates a material amount of useful energy through friction, and, in addition, accelerates wear on moving parts throughout the car transmission through development of wear and loose motion at the universal joint.

It will be seen that there has been provided a motor mounting which is well suited to fulfill its intended functions. Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an automotive conveyance having a frame, an axle, and spring means suspending said axle from the frame, the combination comprising a sub-frame or cradle mounted on said frame for tilting forwardly and rearwardly, a motor having a drive shaft and movably mounted on said sub-frame for relative tilting about an axis extending substantially in the same direction as said drive shaft, and connections between said motor and said axle enabling the spring means suspending the latter to tend to hold said motor against movement with respect to said frame about the last mentioned axis.

2. In an automotive conveyance having a frame, an axle, and spring means suspending said axle from the frame, the combination comprising a sub-frame or cradle mounted on said frame for tilting forwardly and rearwardly, a motor having a drive shaft and movably mounted on said sub-frame for relative tilting about an axis extending substantially in the same direction as said drive shaft, and means connecting said sub-frame and said motor to said axle to hold each of them against its respectively named tilting movement.

3. In an automotive conveyance, a frame, a sub-frame or cradle pivotally mounted on said frame for tilting about an axis, a motor pivotally mounted on said sub-frame for tilting about an axis normal to said first named axis, resilient means tending to hold said motor and sub-frame stable with respect to the frame, conveyance propelling means, and means connecting said motor in driving relation with the conveyance propelling means.

4. In an automotive conveyance, a frame having side members, opposed trunnions projecting transversely from said frame, a cradle pivotally mounted on said trunnions, a motor having a drive shaft and pivotally mounted on said cradle for tilting about an axis extending substantially in the same direction as said drive shaft, and springs tending to hold said motor and cradle stable with respect to the frame.

5. In an automotive vehicle, a main frame, wheels and a driving axle resiliently connected to said frame, a cradle mounted on said frame for rocking movement about an axis parallel with the axis of said driving axle, a motor having a drive shaft at right angles to said driving axle and mounted on said cradle for pivotal movement about an axis extending substantially in the same direction as said drive shaft, and means connecting said motor to said axle tending to hold said motor against relative pivotal movement.

6. In an automotive vehicle, a main frame, wheels and a driving axle resiliently connected to said frame, a cradle mounted on said frame for rocking movement about an axis parallel with the axis of said driving axle, a motor having a drive shaft at right angles to said driving axle and mounted on said cradle for pivotal movement about an axis extending substantially in the same direction as said drive shaft, and means connecting said motor to said axle for cushioning the pivotal movement of said motor.

7. In an automotive vehicle, a frame, wheels and an axle resiliently connected to said frame, a cradle mounted on said frame for rocking movement about a transverse axis, a motor mounted on said cradle for pivotal movement with respect thereto about a longitudinal axis, whereby said motor is universally movable about said frame, and means connecting said motor to said axle for rocking the former about its transverse axis as the latter moves relatively to said frame.

8. In an automotive vehicle, a frame, wheels and an axle resiliently connected to said frame, a cradle mounted on said frame for rocking movement about a transverse axis, a motor mounted on said cradle for pivotal movement with respect thereto about a longitudinal axis, whereby said motor is universally movable about said frame, and means connecting said cradle to said axle for rocking said cradle on vertical movement of said axle relative to said frame and cushioning said motor against pivotal movement relative to said frame.

9. In an automotive vehicle, a frame, wheels and an axle resiliently connected to said frame, a cradle mounted on said frame for pivotal movement about a transverse axis, a motor having a torque tube rigid therewith, said motor and torque tube being mounted on said cradle for pivotal movement about a longitudinal axis, and means resiliently anchoring said torque tube to said axle.

10. In an automotive vehicle, a frame, wheels and an axle connected to said frame, a motor having a torque tube rigid therewith, means mounting said motor and tube for universal movement on said frame, said torque tube being connected with but rotatable with respect to said axle, and a spring anchoring said tube to said axle for resiliently limiting relative rotative movement therebetween.

11. In an automotive vehicle, a frame, wheels and an axle resiliently connected to said frame, a cradle mounted on said frame for pivotal movement about a transverse axis, a motor having a torque tube rigid therewith, said motor and torque tube being pivotally mounted on said cradle for movement about a longitudinal axis, said torque tube being connected with but rotatable with respect to said axle, and a spring anchoring said torque tube to said axle for resiliently limiting relative rotative movement therebetween.

12. In an automotive vehicle, a frame, driving wheels and an axle resiliently connected to said frame, a cradle mounted on said frame for pivotal movement about a transverse axis, a motor having a torque tube rigid therewith and concentric with its crank shaft, bearings on said cradle for pivotally supporting said motor and torque tube about the crank shaft axis, whereby said motor is universally movable with respect to said frame, means for anchoring said torque tube against movement with respect to said axle for transmission of vibratory and twisting impulses from said motor to said axle independently of the frame, and a propeller shaft to transmit power from said motor to said driving wheels, said shaft being mounted within said torque tube in constant alinement with the motor crank shaft.

13. In an automotive vehicle, a frame, driving wheels and an axle resiliently connected to said frame, a cradle mounted on said frame for pivotal movement about a transverse axis, a motor having a crank shaft, bearings on said cradle for pivotally supporting said motor about its crank shaft axis, whereby said motor is universally movable with respect to the frame, a propeller shaft to transmit power from said motor to said driving wheels, and means keeping said shaft and the motor crank shaft constantly in alinement.

14. In an automotive vehicle, a frame, driving wheels and an axle resiliently connected to said frame, a cradle mounted on said frame for pivotal movement about a transverse axis, bearings on said cradle for pivotally supporting said motor about a longitudinal axis thereof, whereby said motor is universally movable with respect to the frame, a propeller shaft connecting said motor and said axle, and means keeping said shaft constantly in alinement with said longitudinal motor axis.—

15. An automotive vehicle comprising, in combination, a body and frame unit including a frame, a rear axle and driving wheels, and a separable power plant and driving unit, comprising a cradle, and a motor having a torque tube rigid therewith, said motor and torque tube being pivotally mounted on said cradle for movement about a longitudinal axis, and said cradle being removably mounted on said frame to rock about a transverse axis.

16. In an automobile, in combination; a body-supporting, rigid frame, a rear axle for the driving wheels and a front axle for the steering wheels, springs between said frame and said axles adjacent the ends of the latter, a motor supported by said frame adjacent said front axle and mounted for limited pivotal movement about an axis extending lengthwise of said frame and for forward and rearward tilting movement with respect to said frame, and resilient means connected to react between said motor and one of said axles for restraining and cushioning said motor against said pivotal movement relative to said frame.

17. In an automobile, in combination; a body-supporting, rigid frame, a rear axle for the driving wheels and a front axle for the steering wheels, springs between said frame and said axles adjacent the ends of the latter, a motor supported by said frame adjacent said front axle and mounted for limited pivotal movement about an axis extending lengthwise of said frame and for forward and rearward tilting movement with respect to said frame, and resilient means connected to react between said motor and said rear axle for restraining and cushioning said motor against said pivotal movement relative to said frame.

18. In an automobile, in combination; a body-supporting, rigid frame, a rear axle for the driving wheels and a front axle for the steering wheels, springs between said frame and said axles adjacent the ends of the latter, a motor supported by said frame adjacent said front axle and mounted for limited pivotal movement about an axis which is at all times located in a single vertical plane extending lengthwise of said frame and about an axis transverse to said frame, means connecting said motor to said rear axle for transmitting movement of the latter toward and away from said frame into pivotal movement of said motor about said transverse axis, and resilient means connected to react between said motor and one of said axles for restraining and cushioning said motor against said lengthwise pivotal movement relative to said frame.

19. In an automobile, in combination; a body-supporting, rigid frame, a rear axle for the driving wheels and a front axle for the steering wheels, springs between said frame and said axles adjacent the ends of the latter, a motor supported by said frame adjacent said front axle and mounted for limited pivotal movement about an axis which is at all times located in a single vertical plane extending lengthwise of said frame and about an axis transverse to said frame, means connecting said motor to said rear axle for transmitting movement of the latter toward and away from said frame into pivotal movement of said motor about said transverse axis, and resilient means connected to react between said motor and said rear axle for restraining and cushioning said motor against said lengthwise pivotal movement relative to said frame.

GEAROLD F. LOVELESS.